United States Patent
Shiraki et al.

(10) Patent No.: US 8,164,842 B2
(45) Date of Patent: Apr. 24, 2012

(54) LENS DRIVING DEVICE, CAMERA, AND CAMERA-EQUIPPED CELLULAR PHONE

(75) Inventors: Manabu Shiraki, Kanagawa (JP); Koji Toyama, Kanagawa (JP)

(73) Assignee: Shicoh Co., Ltd., Kanagawa (JP)

( * ) Notice: Subject to any disclaimer, the term of this patent is extended or adjusted under 35 U.S.C. 154(b) by 0 days.

(21) Appl. No.: 12/906,480

(22) Filed: Oct. 18, 2010

(65) Prior Publication Data
US 2011/0090580 A1   Apr. 21, 2011

(30) Foreign Application Priority Data
Oct. 21, 2009 (JP) .................................. 2009-242068

(51) Int. Cl.
*G02B 7/02* (2006.01)

(52) U.S. Cl. ...................................................... 359/824

(58) Field of Classification Search ........... 359/824–826
See application file for complete search history.

(56) References Cited

U.S. PATENT DOCUMENTS
2008/0259468 A1* 10/2008 Chung .......................... 359/814

FOREIGN PATENT DOCUMENTS
JP   2007-143210   6/2007
JP   2009-014890   1/2009

* cited by examiner

*Primary Examiner* — Scott J Sugarman
*Assistant Examiner* — Vipin Patel
(74) *Attorney, Agent, or Firm* — Dilworth & Barrese, LLP.

(57) ABSTRACT

A lens driving device 1 is provided, in which a spring 11 includes an outer ring portion 11b that is fixed to a body 5, an inner ring portion 11a that is fixed to a lens support 7, and an arm portion 11c that connects the outer ring portion 11b and the inner ring portion 11a, and the lens support 7 is moved in an optical axis direction of a lens by way of an electromagnetic force that is generated by applying electric current to a coil 15 from a terminal member 6, the terminal member 6 including a superimposed portion 6a that is superimposed on the outer ring portion of 11b of the spring 11, and a power supply terminal 6b that protrudes from the superimposed portion 6a, and the terminal member 6 disposing the superimposed portion 6a between the outer ring portion 11b of the spring and the body 5.

6 Claims, 3 Drawing Sheets

LENS DRIVING DEVICE, CAMERA, AND CAMERA-EQUIPPED CELLULAR PHONE

This application is based on and claims the benefit of priority from Japanese Patent Application No. 2009-242068, filed on 21 Oct. 2009, the content of which is incorporated herein by reference.

BACKGROUND OF THE INVENTION

1. Field of the Invention

The present invention relates to an autofocus lens driving device used for a miniature camera, and to a camera and a camera-equipped cellular phone including the lens driving device.

2. Related Art

Patent Document 1 discloses that a spring provided between a body and a lens support supports the lens support so as to move freely in an optical axis direction relative to the body, and that the spring is electrically connected to a coil, and a terminal that is provided to the spring applies electric current to the coil via the spring.

The spring of Patent Document 1 is formed integrally with a power supply terminal that protrudes from the body.

Moreover, Patent Document 2 discloses that, in a configuration similar to the lens driving device disclosed in Patent Document 1, a power supply terminal is manufactured separately from a spring, and the power supply terminal is connected to the spring by way of welding or bonding.

PRIOR ART DOCUMENT

Patent Document 1: Japanese Unexamined Patent Application Publication No. 2007-143210
Patent Document 2: Japanese Unexamined Patent Application Publication No. 2009-14890

PROBLEMS TO BE SOLVED BY THE INVENTION

However, in the lens driving device of Patent Document 1, although the power supply terminal and the spring are integrally formed using the same member, the technical specifications (elastic force, thickness, etc.) of the spring are different from the technical specifications (strength, thickness, etc.) of the power supply terminal, leading to a problem in that designing them is difficult. In addition, since the power supply terminal protrudes from the spring, there are problems in that the spring is bulky, is difficult to be transferred and transported, and is likely to be damaged.

On the other hand, in the technique of Patent Document 2, since the spring and the terminal are separate members, the members can be easily adapted to the technical specifications of each member, and damage to the spring while transferring the spring before assembling the lens driving device can be prevented; however, since the terminal is extremely small, there are problems in that handling thereof is difficult, and bonding (soldering, etc.) thereof to the spring is troublesome.

Accordingly, an object of the present invention is to provide a lens driving device, a camera and a camera-equipped cellular phone, in which it is easy for a spring to be assembled into the lens driving device to be transported and transferred, deformation or damage to the spring can be prevented, design freedom is high, and manufacturing is easy.

SUMMARY OF THE INVENTION

A first aspect of the invention is a lens driving device that includes: a body; a yoke of a barrel shape; a lens support that is disposed on an inner circumferential side of the yoke; a coil that is fixed on an outer periphery of the lens support; a magnet that is provided to the yoke; a spring that is electrically connected to the coil, the spring having an outer ring portion that is fixed to the body, an inner ring portion that is fixed to the lens support, and an arm portion that connects the outer ring portion and the inner ring portion, and the spring supporting the lens support so as to move freely in an optical axis direction relative to the body; and a terminal member that abuts with the spring, the terminal member having a superimposed portion that is superimposed on the outer ring portion of the spring, and a power supply terminal that protrudes from the superimposed portion, and the terminal member disposing the superimposed portion between the outer ring portion of the spring and the body, in which the lens support is moved in the optical axis direction of a lens by way of an electromagnetic force that is generated by applying electric current to the coil from the terminal member.

According to the first aspect of the invention, in the lens driving device that applies electric current from the terminal to the coil via the spring, the terminal member with the power supply terminal has the superimposed portion that is superimposed on the outer ring portion of the spring, and the superimposed portion is sandwiched between the spring and the body; therefore, the terminal member can be easily assembled, can be easily bonded to the spring, and the terminal member can be stably fixed.

Since the power supply terminal that applies electric current to the spring is a separate member from the spring, the spring is not as bulky as is conventionally, and the spring can be easily transported and transferred.

Moreover, since the spring and the power supply terminal are separate members, the spring and the power supply terminal can be freely designed in accordance with technical specifications thereof, respectively. For example, a thickness of the spring can be freely designed in accordance with the required functions, and a thickness, a shape and quality of material required for the power supply terminal can be freely selected and designed.

In the first aspect of the invention, it is preferable that the power supply terminal is bent in parallel with the optical axis of the lens from the superimposed portion.

According to this, the power supply terminal can be bent without affecting the spring functions.

Furthermore, it is preferable that the superimposed portion of the terminal member has the same shape as the outer ring portion of the spring.

According to this, since an area of the superimposed portion that is superimposed on the spring can be increased, the terminal member can be stably attached, and the reliability of the attachment can be enhanced.

In addition, since the superimposed portion of the terminal member has the same shape as the outer ring portion of the spring, the terminal member can be attached without changing a conventional design in which the outer ring portion of the spring is fixed to the body.

The strength of the outer ring portion of the spring can be reinforced by the terminal member, and the spring can be easily assembled.

Furthermore, it is preferable that the spring is divided into a plurality of portions and separated, the portions thus divided are insulated from each other, and a terminal member is provided to each of the portions thus divided.

According to this, the power supply terminal can be easily attached to the portions of the spring, even if such division of has resulted in a small area.

A second aspect of the invention is a camera, in which the lens driving device according to the first aspect of the invention is mounted to a substrate to which picture elements are provided, and a power supply terminal is connected to the substrate. According to this camera, the aforementioned effects can be obtained.

A third aspect of the invention is a camera-equipped cellular phone, including the camera according to the second aspect of the invention. According to this camera-equipped cellular phone, the aforementioned effects can be obtained.

DETAILED DESCRIPTION OF THE INVENTION

Figure 1:
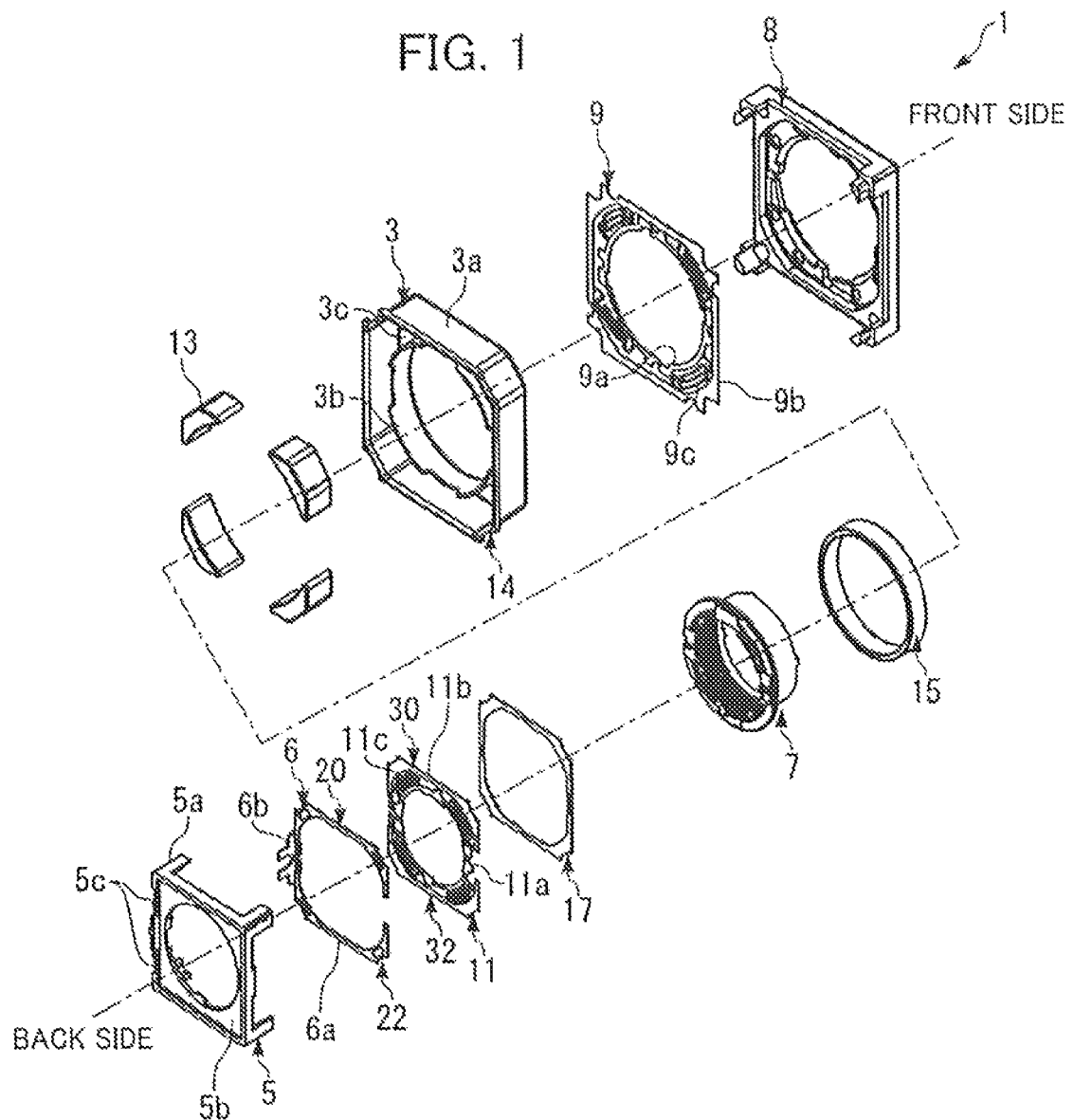
FIG. 1 is an exploded perspective view of a lens driving device according to an embodiment of the present invention.
Figure 3:
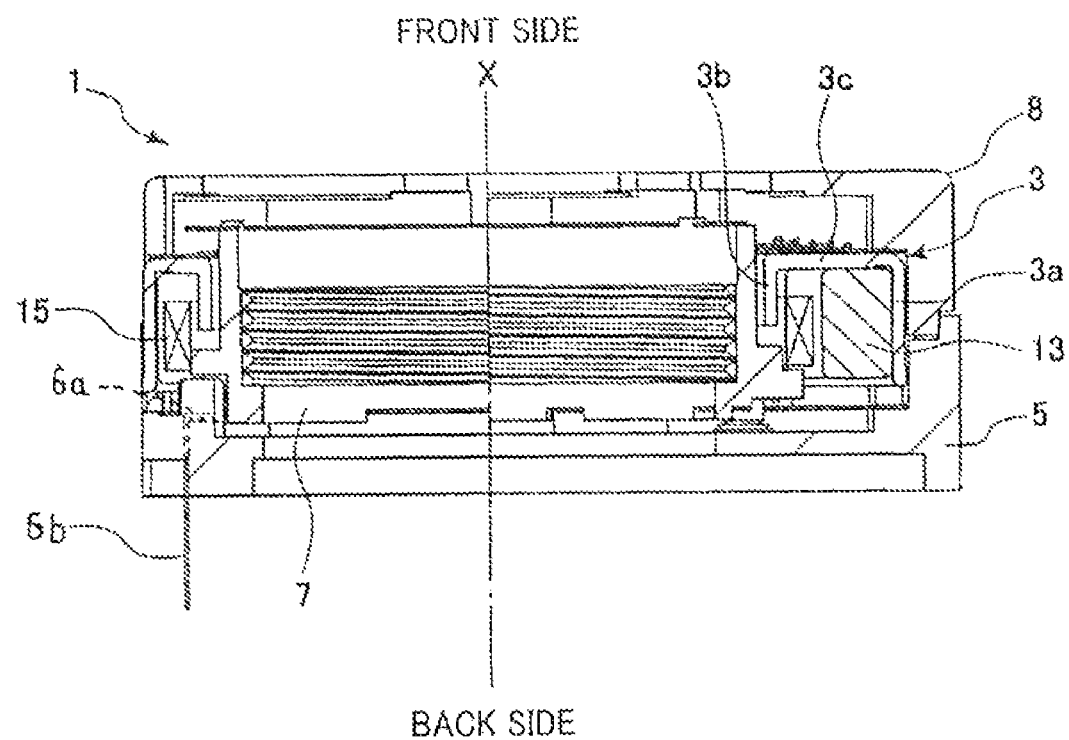
FIG. 3 is a cross-sectional view along a line A-A of FIG. 4.
Figure 4:
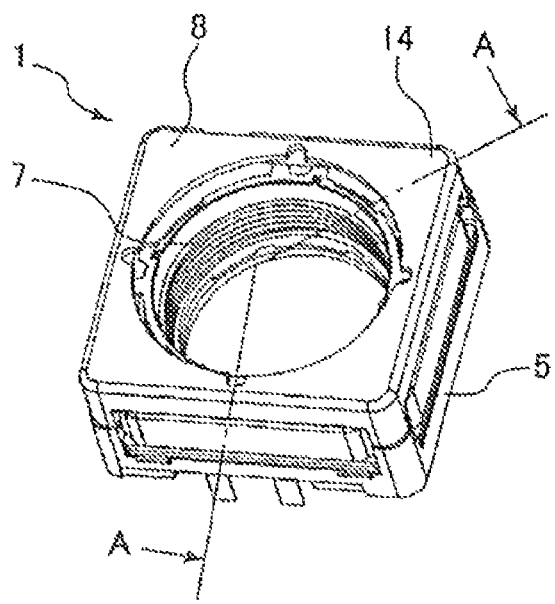
FIG. 4 is a perspective view of the lens driving device according to the present embodiment.

An embodiment of the present invention is described hereinafter with reference to the drawings. A lens driving device 1 according to an embodiment is a lens driving device of an autofocus camera incorporated into a cellular phone. As shown in FIGS. 1 and 3, the lens driving device 1 includes: a barrel shaped yoke 3; a lens support 7; a front side spring 9; a back side spring (spring) 11, a base (body) 5 disposed on a back side of the yoke 3; and a frame 8 disposed on a front side of the yoke 3, in which a coil 15 is fixed to an outer periphery of the lens support 7. An insulator (spacer) 17 is disposed between the yoke 3 and the back side spring 11. A terminal member 6 is disposed between the back side spring 11 and the base 5. This lens driving device 1 is extremely small with a width and depth of about 10 mm and a height of about 3.5 mm.

When the yoke 3 is viewed from the front side, an outer periphery thereof is rectangular in a plan view, an inner periphery is circular in a plan view, and the yoke 3 is composed of an outer circumferential side wall 3a, an inner circumferential side wall 3b, and a connecting wall 3c that connects the outer circumferential side wall 3a and the inner circumferential side wall 3b with a space therebetween, in which a cross section formed by the outer circumferential side wall 3a, the inner circumferential side wall 3b and the connecting wall 3c forms a letter U shape.

In each corner 14 of the yoke 3, a magnet 13 is fixed on an inner periphery of the outer circumferential side wall 3a. The magnet 13 is provided only to the corners 14 of the yoke 3.

The lens support 7 has a substantially cylindrical shape, a lens 8 (not illustrated) is fixed to an inner periphery thereof, and the lens support 7 is disposed to an inner circumferential side of the yoke 3, and is disposed so as to move freely in the optical axis direction (symbol X in FIG. 3). The coil 15 that is wound in a barrel shape is attached to an outer periphery of the lens support 7.

As shown in FIG. 3, the coil 15 is disposed between the outer circumferential side wall 3a and the inner circumferential side wall 3b of the yoke 3, and is positioned between the magnet 13 and the inner circumferential side wall 3b in the corners 14 having the magnet 13, so that the coil 15 moves together with the lens support 7 in the front-back direction within the yoke 3.

The base 5 has an outer wall 5a positioned on the outer periphery of the yoke 3 and a base portion 5b positioned on the back side of the yoke 3 (back side in the optical axis direction of the lens), and an outer circumferential side portion 11b (to be described later) of the back side spring 11 is placed on the base portion 5b of the base 5 via the terminal member 6.

Two terminal receiving portions 5c and 5c are provided on one side of the base 5. In the present embodiment, the two terminal receiving portions 5c and 5c are integrally formed in parallel.

The front side spring 9 is a toroidal leaf spring including an inner circumferential side portion 9a and an outer circumferential side portion 9b, in which the inner circumferential side portion 9a is attached to the lens support 7, and the outer circumferential side portion 9b is fixed so as to be sandwiched between the yoke 3 and a frame 8. The inner circumferential side portion 9a and the outer circumferential side portion 9b are connected by an arm portion 9c that is capable of elastic deformation.

Although the back side spring 11 is a toroidal leaf spring as a whole, in the present embodiment, the back side spring 11 is divided into two portions consisting of a first side portion (half body) 30 and a second side portion (half body) 32, in which the first side portion 30 and the second side portion 32 have the same configuration. Each of the outer circumferential side portions 11b and 11b of the back side spring 11 is sandwiched between the base 5 and the yoke 3 via the insulator (spacer) 17, and the insulator 17 achieves electrical insulation between the back side spring 11 and the yoke 3. Each of the inner circumferential side portions 11a and 11a is attached to a rear end of the lens support 7. In the back side spring 11, the inner circumferential side portions 11a are respectively connected to the outer circumferential side portions 11b by an arm portion 11c that is capable of elastic deformation.

By way of soldering, etc., the first side portion 30 is electrically connected to one end of the coil 15, and the second side portion 32 is electrically connected to another end of the coil 15, respectively, so that direct current is applied from the first side portion 30 through the coil 15 to the second side portion 32.

The terminal member 6 including power supply terminals 33 and 33 is superimposed on the back side spring 11, so that electric current is applied from the terminal member 6 to the back side spring 11. In the present embodiment, a first terminal member 20 is superimposed on the first side portion 30 that configures the back side spring 11, and a second terminal member 22 is superimposed on the second side portion 32 that configures the back side spring 11.

The terminal member 6 has the same shape as the outer circumferential side portion (outer ring portion) 11b of the back side spring 11, and is superimposed on the back side spring 11. In the present embodiment, in accordance with the back side spring 11 being divided into the first side portion 30 and the second side portion 32, the terminal member 6 is also divided into a first terminal member 20 and a second terminal member 22. The first terminal member 20 and the second terminal member 22 have the same shape, and include a superimposed portion 6a and a power supply terminal 6b, which are superimposed on the outer circumferential side portion 11b of the back side spring 11.

The superimposed portion 6a is a plate face that is orthogonal to the optical axis, the power supply terminal 6b is bent at a right angle relative to the superimposed portion 6a, and an end of the power supply terminal 6b is held to the base 5 by abutting with, or being inserted into, the terminal receiving portion 5c of the base 5.

Figure 2:
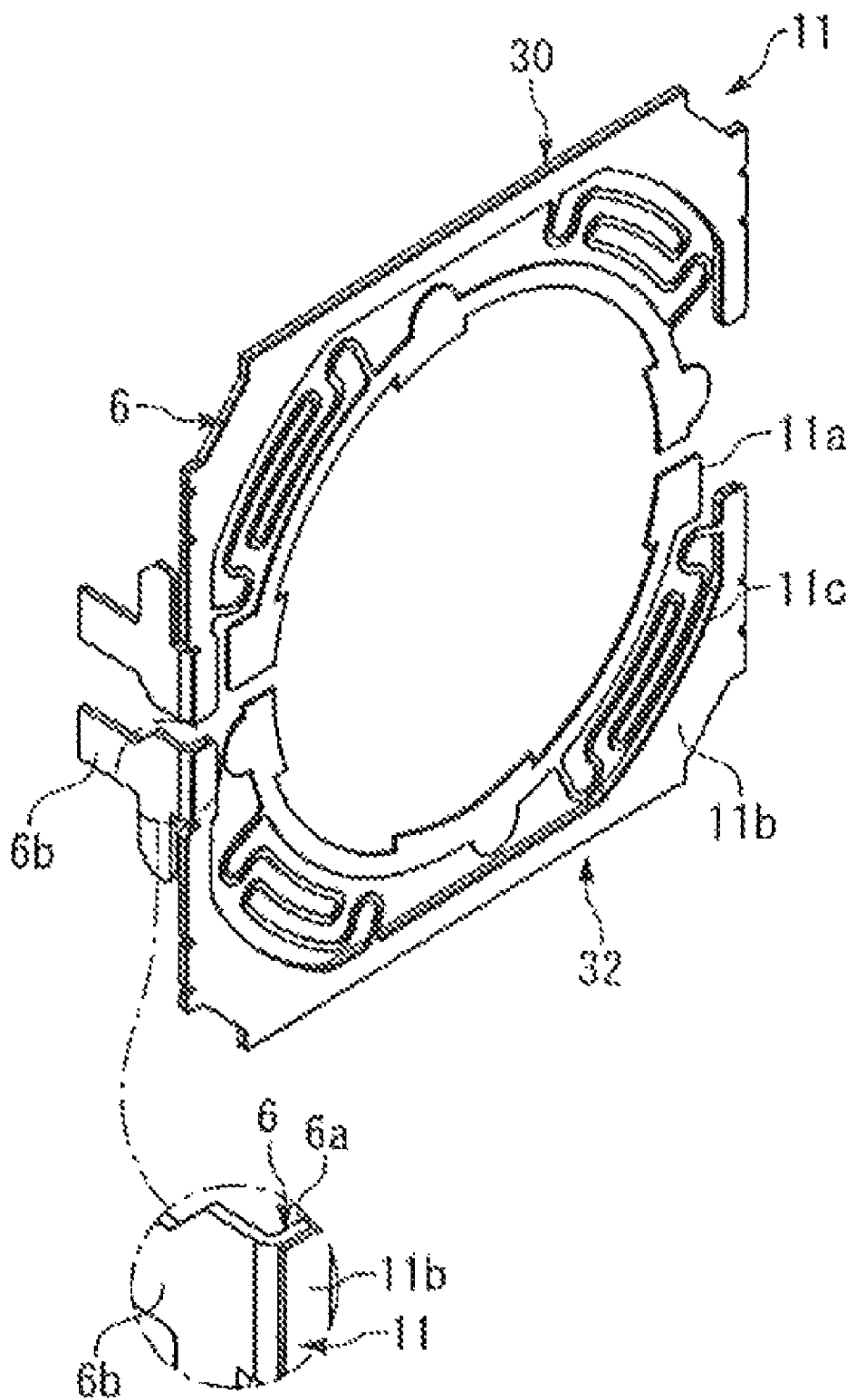
FIG. 2 is a perspective view of a back side spring to which a terminal member has been fixed.

As shown in FIG. 2, the terminal member 6 is superimposed on and fixed to the back side spring 11, and is integrally fixed to the back side spring 11. Fixing is performed by way of a method such as brazing, and electrical connection is also established in the fixation.

The frame 8 is disposed on the front side of the lens support 7, retains the outer circumferential side portion 9b of the front side spring 9 by sandwiching between the frame 8 and the yoke 3, and is fixedly engaged with the base 5 such that the base 5 and the frame 8 form the body.

Next, assembly, operations and effects of the lens driving device 1 according to the first embodiment are described. In the assembly of the lens driving device 1, as shown in FIG. 1, the base 5, the back side spring 11 to which the terminal member 6 has been fixed, the insulator (spacer) 17, the lens support 7 to which the coil 15 has been attached, the yoke 3 to which the magnets 13 have been fixed, the front side spring 9, and the frame 8 are assembled in this order. It should be noted that the first side portion 30 of the back side spring is soldered to one end of the coil 15, the second side portion 32 is soldered to another end of the coil 15, and the power supply terminal 6b of the terminal member 6 is fixed by bonding to the terminal receiving portion 5c of the base 5.

In the lens driving device 1 according to the present embodiment, when electric current is applied from the power supply terminal 6b of the first terminal member 20, flows through the superimposed portion 6a, the first side portion 30 of the back side spring 11 and the coil 15 to the second side portion 32 of the back side spring 11, the superimposed portion 6a of the second terminal member 22, and the power supply terminal 6b of the second terminal member 22.

In addition, when electric current is applied to the coil 15, by way, of an electromagnetic force acting on the coil 15, the lens support 7 moves against biasing forces of the front side spring 9 and the back side spring 11, and is suspended at a position where the forces of the springs 9 and 11 are balanced by the electromagnetic force.

According to the present embodiment, the terminal member 6 that applies electric current to the back side spring 11 is manufactured separately from the back side spring (spring) 11, the superimposed portion 6a of the terminal member 6 is superimposed on the back side spring 11, and the superimposed portion 6a is sandwiched between the back side spring 11 and the base (body) 5; therefore, the terminal member 6 can be easily assembled, can be easily adhered to the back side spring 11, and the terminal member 6 can be stably fixed.

Since the power supply terminal 6b that applies electric current to the back side spring 11 is a separate member from the back side spring 11, the back side spring 11 is not as bulky as is conventionally, and the spring can be easily transported and transferred before assembling the lens driving device.

Since the back side spring 11 and the power supply terminal 6b are separate members, the back side spring 11 and the power supply terminal 6b can be freely designed in accordance with technical specifications thereof, respectively. In other words, the thickness of the back side spring 11 can be freely designed in accordance with the required elasticity and strength, and a thickness, a shape and quality of material of the power supply terminal can be freely selected and designed in accordance with the required strength.

The power supply terminal 6b can be bent without affecting the back side spring 11. Particularly, in the present embodiment, since the back side spring 11 is divided into the first side portion 30 and the second side portion 32, handling thereof is difficult; however, a terminal can be easily provided to the spring portions 30 and 32 having a small area.

Since the superimposed portion 6a of the terminal member 6 has the same shape as the outer circumferential side portion (outer ring portion) 11b of the back side spring 11, an area of the superimposed portion 6a that is superimposed on the spring can be increased, and the terminal member 6 can be stably attached; therefore, the reliability of the attachment is high.

Moreover, since the superimposed portion 6a of the terminal member 6 has the same shape as the outer circumferential side portion 11b of the back side spring 11, the shape and dimension of the base 5 and other parts that conventionally fix the back side spring 11 are not affected; therefore, the terminal member 6 can be attached without changing a conventional design.

In addition, the strength of the outer circumferential portion 11b of the back side spring 11 can be reinforced by the terminal member 6, and the back side spring 11 can be easily handled and assembled.

Particularly, in the present embodiment, in accordance with the back side spring 11 being divided into the first side portion 30 and the second side portion 32, the terminal member 6 is also divided in accordance therewith, and is superimposed on the first side portion 30 and the second side portion 32; therefore, the power supply terminal 6b can be easily attached even if such division of the back side spring 11 has resulted in a small area.

The back side spring 11 is not processed by bending the integrally formed terminal portion as is conventionally; therefore, deformation and damage of the spring 11 during processing can be prevented.

Since the back side spring 11 is not subjected to folding processing of the spring 11, there is no constraint due to a bending position; therefore, the degrees of freedom are high in terms of design and terminal placement of the spring 11.

The present invention is not limited to the aforementioned embodiments, and can be modified in various ways within a scope that does not depart from the sprit of the present invention.

For example, a configuration may be employed in which the back side spring 11 is not divided, but rather used as a single part, the terminal member 6 is also superimposed as a single part, the terminal member 6 is superimposed also on the front side spring 9, and current is applied to the coil 15 through the two terminal members 6 and 6.

In the terminal member 6, the power supply terminal 6b is not limited to being bent at a right angle relative to the plate face of the superimposed portion 6a, and the power supply terminal 6b and the superimposed portion 6a may be provided substantially in parallel.

Furthermore, fixing by superimposing the terminal member 6 and the back side spring 11 is not limited to brazing, etc., and may be a connection by way of fitment, etc.

What is claimed is:

1. A lens driving device, comprising:
a body;
a yoke of a barrel shape;
a lens support that is disposed on an inner circumferential side of the yoke;
a coil that is fixed on an outer periphery of the lens support;
a magnet that is provided to the yoke;
a spring that is electrically connected to the coil, the spring including an outer ring portion that is fixed to the body, an inner ring portion that is fixed to the lens support, and an arm portion that connects the outer ring portion and the inner ring portion, and the spring supporting the lens support so as to move freely in an optical axis direction relative to the body; and a terminal member that abuts with the spring, the terminal member including a superimposed portion that is superimposed on the outer ring portion of the spring, and a power supply terminal that protrudes from the superimposed portion, and the terminal member disposing the superimposed portion between the outer ring portion of the spring and the body, wherein the lens support is moved in the optical axis direction of a lens by way of an electromagnetic force that is generated by applying electric current to the coil from the terminal member, and the spring and terminal member are separate members.

2. The lens driving device according to claim 1, wherein the power supply terminal is bent in parallel with the optical axis of the lens from the superimposed portion.

3. The lens driving device according to claim 2, wherein the superimposed portion of the terminal member has the same shape as the outer ring portion of the spring.

4. A camera, wherein the lens driving device according to claim 1 is mounted to a substrate to which picture elements are provided, and a power supply terminal is connected to the substrate.

5. A camera-equipped cellular phone, comprising the camera according to claim 4.

6. A lens driving device, comprising:
a body;
a yoke of a barrel shape;
a lens support that is disposed on an inner circumferential side of the yoke;
a coil that is fixed on an outer periphery of the lens support;
a magnet that is provided to the yoke;

a spring that is electrically connected to the coil, the spring including an outer ring portion that is fixed to the body, an inner ring portion that is fixed to the lens support, and an arm portion that connects the outer ring portion and the inner ring portion, and the spring supporting the lens support so as to move freely in an optical axis direction relative to the body; and a terminal member that abuts with the spring, the terminal member including a superimposed portion that is superimposed on the outer ring portion of the spring, and a power supply terminal that protrudes from the superimposed portion, and the terminal member disposing the superimposed portion between the outer ring portion of the spring and the body, wherein the lens support is moved in the optical axis direction of a lens by way of an electromagnetic force that is generated by applying electric current to the coil from the terminal member, the power supply terminal is bent in parallel with the optical axis of the lens from the superimposed portion, the superimposed portion of the terminal member has the same shape as the outer ring portion of the spring, and the spring is divided into a plurality of portions and separated, the portions thus divided are insulated from each other, and a terminal member is provided to each of the portions thus divided.

* * * * *